US011984971B2

(12) United States Patent
Shin et al.

(10) Patent No.: US 11,984,971 B2
(45) Date of Patent: May 14, 2024

(54) NON-COMMUNICATION ELECTRONIC WARFARE SYSTEM DESIGN ANALYSIS SYSTEM BASED ON ENGINEERING MODELING AND CONTROL METHOD THEREOF

(71) Applicant: AGENCY FOR DEFENSE DEVELOPMENT, Daejeon (KR)

(72) Inventors: Dongcho Shin, Daejeon (KR); Chiho Lee, Daejeon (KR); Wookhyeon Shin, Daejeon (KR); Taehyun Kim, Daejeon (KR); Unseob Jeong, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 532 days.

(21) Appl. No.: 17/337,828

(22) Filed: Jun. 3, 2021

(65) Prior Publication Data

US 2021/0391940 A1 Dec. 16, 2021

(30) Foreign Application Priority Data

Jun. 10, 2020 (KR) ........................ 10-2020-0070553

(51) Int. Cl.
*H04K 3/00* (2006.01)

(52) U.S. Cl.
CPC ................. *H04K 3/62* (2013.01); *H04K 3/44* (2013.01); *H04K 3/45* (2013.01)

(58) Field of Classification Search
CPC ............... H04K 3/44; H04K 3/45; H04K 3/62
See application file for complete search history.

(56) References Cited

U.S. PATENT DOCUMENTS 6,748,351 B1 * 6/2004 Hynes ...................... H04K 3/20 703/22
9,846,223 B1 * 12/2017 Hellwig .................. G01S 7/021
2006/0001568 A1 * 1/2006 Alford ..................... H04K 3/41 342/170

FOREIGN PATENT DOCUMENTS

KR 10-2020-0013479 A 2/2020

OTHER PUBLICATIONS

Partial English translation of D1, "Model-based electronic warfare system design analysis equipment" (Feb. 2018) in 57 pages.

* cited by examiner

*Primary Examiner* — Nguyen T Vo
(74) *Attorney, Agent, or Firm* — Knobbe, Martens, Olson & Bear, LLP

(57) ABSTRACT

This application relates to a non-communication electronic warfare system design analysis system based on engineering modeling. In one aspect, the system includes a scenario unit transmitting a simulation threat signal corresponding to an input scenario and a threat signal simulator transmitting an actual threat signal. The system may also include an electronic warfare support receiving model unit allocating a jamming technique. The system may further include an electronic warfare support receiving analyzer allocating the jamming technique to the received actual threat signal and an electronic attack jamming model unit modelling a device for generating a simulation jamming signal. The system may further include an electronic attack jamming generator generating an actual jamming signal and a simulation situation demonstration controller analyzing performance by using the actual jamming signal and the actual threat signal.

12 Claims, 4 Drawing Sheets

NON-COMMUNICATION ELECTRONIC WARFARE SYSTEM DESIGN ANALYSIS SYSTEM BASED ON ENGINEERING MODELING AND CONTROL METHOD THEREOF

CROSS-REFERENCE TO RELATED APPLICATION

This application claims priority to Korean Patent Application No. 10-2020-0070553, filed on Jun. 10, 2020. The entire contents of the application on which the priority is based are incorporated herein by reference.

TECHNICAL FIELD

The present disclosure relates to a non-communication electronic warfare design analysis support system based on engineering modeling, more particularly, to a Modeling and Simulation (M&S) system that evaluates and analyzes performance before building an actual prototype in a development stage of a weapon system for non-communication electronic warfare.

BACKGROUND

In general, electronic warfare can be divided into electronic attack, electronic protection, or electronic warfare support according to characteristics.

The electronic attack uses electromagnetic waves to incapacitate an opponent's electronic equipment.

The electronic protection is performed to protect the electronic equipment from the opponent's electronic attack.

The electronic warfare support recognizes threat by collecting and analyzing the opponent's electromagnetic spectrum energy. Further, it supports the electronic warfare by using location analysis, signal analysis, and eavesdropping, etc. for the threat.

At this time, in the electronic warfare attacking the opponent or defending the opponent's attack, hundreds to hundreds of billions of costs are inevitably required to develop or introduce only an electronic warfare system.

In addition, in order to test performance of system-developed electronic warfare equipment, there is a problem that enormous cost is required to actually mobilize actual aircraft, vessels and the electronic warfare equipment (missiles or radar).

Therefore, it is necessary to sufficiently verify in advance how useful the electronic warfare system to be developed or introduced can be to prevent wasting national costs.

Conventionally, after designing and developing an electronic warfare weapon system, in order to evaluate performance thereof before deploying it to actual battle, there was a problem in that the weapon system had to be evaluated using individual performance evaluation equipment.

SUMMARY

The embodiments of the present disclosure provide a non-communication electronic warfare system design analysis system based on engineering modeling for improving the above-described problems of related art.

In addition, the non-communication electronic warfare system design analysis system based on engineering modeling according to the embodiments provides an electronic warfare support (ES) receiving analyzer in a hardware form used for ES modeling.

In addition, the non-communication electronic warfare system design analysis system based on engineering modeling according to the embodiments provides an ES receiving analysis model unit in a software form used for ES modeling.

In addition, the non-communication electronic warfare system design analysis system based on engineering modeling according to the embodiments provides an electronic attack (EA) jamming generator in the hardware form used for EA modeling.

In addition, the non-communication electronic warfare system design analysis system based on engineering modeling according to the embodiments provides an EA jamming generating model unit in the software form used for EA modeling.

In addition, the non-communication electronic warfare system design analysis system based on engineering modeling according to the embodiments provides electronic warfare threat environment Modeling and Simulation (M&S) for verifying a result of analyzing a system design by using an input simulation Radio Frequency (RF) threat signal and a generated simulating RF jamming signal.

In addition, the non-communication electronic warfare system design analysis system based on engineering modeling according to the embodiments provides a development support device for generating an actual RF threat signal and measuring a transmitted actual RF jamming signal.

In addition, the non-communication electronic warfare system design analysis system based on engineering modeling according to the embodiments provides a simulation situation demonstration controller for providing status and a result according to simulation.

The technical problems to be achieved by the embodiment are not limited to the technical problems described above, and other technical problems that are not described may be clearly understood by those skilled in the art from the description of the embodiments.

In accordance with one embodiment of the present disclosure, there is provided a non-communication electronic warfare system design analysis system based on engineering modeling, the system comprising a scenario unit configured to transmit a simulation threat signal corresponding to an input scenario; a threat signal simulator configured to transmit an actual threat signal; an electronic warfare support receiving model unit configured to receive the simulation threat signal and model a device for allocating a jamming technique; an electronic warfare support receiving analyzer configured to allocate the jamming technique to the received actual threat signal by using the modeled device; an electronic attack jamming model unit configured to model a device for generating a simulation jamming signal corresponding to the simulation threat signal by using the modeled device for allocating the jamming technique; an electronic attack jamming generator configured to generate an actual jamming signal corresponding to the actual threat signal by using the modeled device for generating the simulation jamming signal; and a simulation situation demonstration controller configured to analyze performance by using the actual jamming signal and the actual threat signal, wherein the simulation situation demonstration controller is further configured to control the scenario unit to reset the scenario if the actual jamming signal does not satisfy a predetermined standard, and control the electronic warfare support receiving model unit to model a device for allocating a jamming technique corresponding to the reset scenario to the actual threat signal.

Further, the electronic warfare support receiving model unit may include an electronic warfare support receiver signal injection model unit configured to receive the simulation threat signal and model a device for converting a frequency of the simulation threat signal into an intermediate frequency; a direction detection receiving model unit configured to interlock with a direction detection DB to receive the simulation threat signal within a range of a detection area; a digital receiver model unit configured to model a device for converting the simulation threat signal of which frequency is converted into the intermediate frequency into a digital signal; and a signal analysis model unit configured to model the device for allocating the jamming technique by using the converted digital signal.

Further, the electronic warfare support receiving analyzer may include a simulation threat signal receiving plate configured to convert a frequency of the received actual threat signal into the intermediate frequency by using the device modeled by the electronic warfare support receiver signal injection model unit; a digital receiving plate configured to convert the actual threat signal of which the frequency is converted into the intermediate frequency into the digital signal by using the device modeled by digital receiver model unit; and a simulation threat signal analyzer configured to allocate the jamming technique to the converted digital signal by using the device modeled by a signal analysis model unit.

Further, the electronic attack jamming model unit may include a jamming signal generating model unit configured to model a device for generating a jamming signal including noise from a jamming signal generating model; a jamming technique generating model configured to model a device for generating the jamming signal by using the allocated jamming technique to the jamming signal including noise; and an electronic attack signal emitting model configured to model a device for converting a frequency of the generated jamming signal into a high frequency and emitting the converted jamming signal to the scenario unit.

Further, the electronic attack jamming generator may include a noise processing unit configured to generate the jamming signal including noise from the jamming signal generating model; a jamming technique generating plate configured to generate the actual jamming signal according to the allocated jamming technique by using the device modeled by the jamming technique generating model; and a jamming transmitting plate configured to convert the frequency of the generated actual jamming signal into the high frequency and emit the converted actual jamming signal to a jamming signal measuring device by using the device modeled by electronic attack signal emitting model.

Further, the jamming signal measuring device configured to measure the actual jamming signal of which frequency is converted into the high frequency; and a measurement controller configured to configured to control the threat signal simulator and the jamming signal measuring device.

In accordance with one embodiment of the present disclosure, there is provided a method of controlling a non-communication electronic warfare system design analysis system based on engineering modeling, the method comprising: transmitting a simulation threat signal corresponding to an input scenario; transmitting an actual threat signal; receiving the simulation threat signal and modeling a device for allocating a jamming technique; allocating the jamming technique to the received actual threat signal by using the modeled device; modeling a device for generating a simulation jamming signal corresponding to the simulation threat signal by using the modeled device for allocating the jamming technique; generating an actual jamming signal corresponding to the actual threat signal by using the modeled device for generating the simulation jamming signal; and analyzing performance by using the actual jamming signal and the actual threat signal, wherein analyzing the performance includes: controlling the scenario to be reset if the actual jamming signal does not satisfy a predetermined standard; and controlling a device for allocating a jamming technique corresponding to the reset scenario to the actual threat signal to be modeled.

Further, the modeling the device for allocating the jamming technique may include receiving the simulation threat signal and modeling a device for converting a frequency of the simulation threat signal into an intermediate frequency; interlocking with a direction detection DB to receive the simulation threat signal within a range of a detection area; modeling a device for converting the simulation threat signal of which frequency is converted into the intermediate frequency into a digital signal; and modeling the device for allocating the jamming technique by using the converted digital signal.

Further, the allocating the jamming technique to the received actual threat signal may include converting a frequency of the received actual threat signal into the intermediate frequency by using the modeled device for converting the frequency into the intermediate frequency; converting the actual threat signal of which the frequency is converted into the intermediate frequency into the digital signal by using the modeled device for converting the simulation threat signal into the digital signal; and allocating the jamming technique to the converted digital signal by using the modeled device for allocating the jamming technique.

Further, modeling the device for generating the simulation jamming signal corresponding to the simulation threat signal may include modeling a device for generating a jamming signal including noise from a jamming signal generating model; modeling a device for generating the jamming signal by using the allocated jamming technique to the jamming signal including noise; and modeling a device for converting a frequency of the generated jamming signal into a high frequency and emitting the converted jamming signal.

Further, generating the actual jamming signal corresponding to the actual threat signal may include generating the jamming signal including noise from the jamming signal generating model by using the modeled device for generating the jamming signal including noise; and generating the actual jamming signal according to the allocated jamming technique by using the modeled device for generating the jamming signal.

Further, converting the frequency of the generated actual jamming signal into the high frequency and emitting the converted actual jamming signal by using the modeled device for converting the frequency into the high frequency and emitting the converted jamming signal; and measuring the jamming signal of which frequency is converted into the high frequency.

The non-communication electronic warfare system design analysis system based on engineering modeling according to the embodiments may provide the ES receiving analysis model unit in the software form to model and simulate an ES device in an engineering level.

In addition, the non-communication electronic warfare system design analysis system based on engineering modeling according to the embodiments may provide the ES receiving analyzer in the hardware form to verify ES models.

In addition, the non-communication electronic warfare system design analysis system based on engineering modeling according to the embodiments may provide the EA jamming model unit in the software form to model and simulate an EA device in the engineering level.

In addition, the non-communication electronic warfare system design analysis system based on engineering modeling according to the embodiments may provide the EA jamming generator in the hardware form to verify EA models.

In addition, the non-communication electronic warfare system design analysis system based on engineering modeling according to the embodiments may provide the non-communication electronic warfare threat environment M&S to analyze elements for the system design and verify the result of analyzing the system design by using the input simulation RF threat signal and the generated simulating RF jamming signal.

In addition, the non-communication electronic warfare system design analysis system based on engineering modeling according to the embodiments may provide the development support device, as a component responsible for input and output of an HILS system based on hardware actual equipment in standard electronic warfare, to generate the actual RF threat signal and measure the transmitted actual RF jamming signal.

In addition, the non-communication electronic warfare system design analysis system based on engineering modeling according to the embodiments may provide the simulation situation demonstration controller to control the simulation and provide the function to show the simulation status and the result according to the simulation.

DETAILED DESCRIPTION

Figure 1:
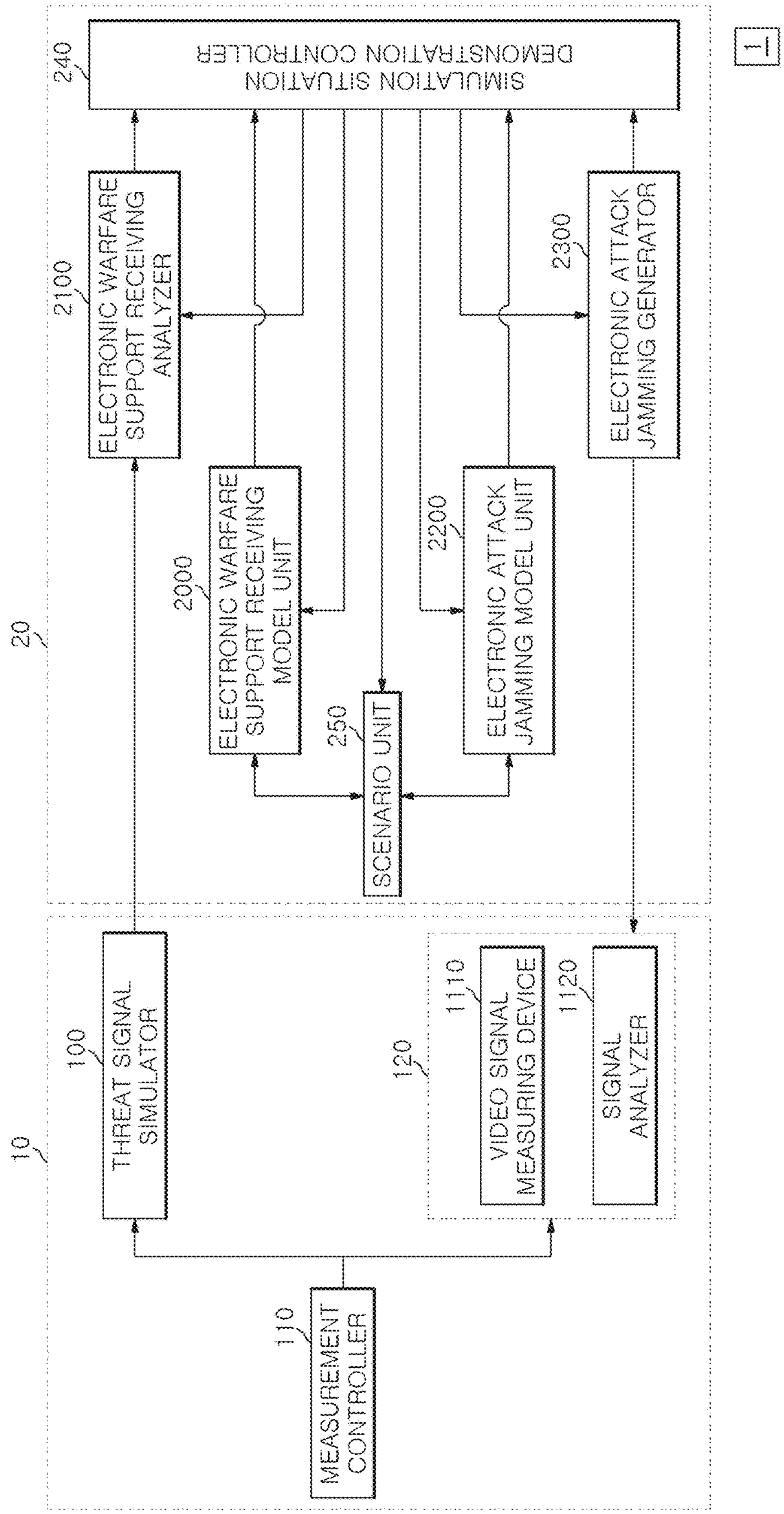
FIG. 1 shows a block diagram illustrating a non-communication electronic warfare system design analysis system based on engineering modeling according to one embodiment.

Hereinafter, exemplary embodiments will be described in detail with reference to the accompanying drawings. Advantages and features of the embodiments, and a method of accomplishing the same will be clearly understood with reference to the embodiments described below in detail together with the accompanying drawings. However, the present disclosure is not limited to the embodiments disclosed below, but may be implemented in many different forms. It is noted that the embodiments are provided to make a full disclosure and also to allow those skilled in the art to know the full scope of the present disclosure, and the embodiments are only defined by the scope of the claims. The same reference numerals refer to the same components throughout the detailed description.

Unless otherwise defined, all terms (including technical and scientific terms) used in the detailed description may be used with meanings that can be commonly understood by those skilled in the art to which the embodiment belongs. In addition, terms defined in a dictionary commonly used are not interpreted ideally or excessively unless explicitly defined specifically. The terms used in the detailed description are for describing the embodiments and are not intended to limit the embodiments. In the detailed description, the singular form also includes the plural form unless specifically stated in the phrase.

Hereinafter, referring to FIG. 1, a non-communication electronic warfare system design analysis system 1 based on engineering modeling according to one embodiment will be described.

FIG. 1 shows a block diagram illustrating the non-communication electronic warfare system design analysis system 1 based on engineering modeling according to one embodiment.

The non-communication electronic warfare system design analysis system 1 based on engineering modeling may include a SILS system that operates as software based on engineering-level modeling, and a HILS system that operates as an actual hardware for verifying function and performance of the SILS system based on a research result thereof.

The SILS system may include an electronic warfare support receiving model unit 2000, an electronic attack jamming model unit 2200, a simulation situation demonstration controller 240, and a scenario unit 250.

The HILS system may include a development support device 10, an electronic warfare support receiving analyzer 2100, an electronic attack jamming generator 2300, and the simulation situation demonstration controller 240.

Hereinafter, the development support device 10 of the HILS system will be described.

The development support device 10 may include a threat signal simulator 100, a measurement controller 110, and a jamming signal measuring device 120.

The threat signal simulator 100 generates an actual RF threat signal. The threat signal simulator 100 transmits the generated actual RF electronic warfare threat signal to the electronic warfare support receiving analyzer 2100.

The jamming signal measuring device 120 receives an actual RF jamming signal generated by the electronic attack jamming generator 2300. The jamming signal measuring device 120 measures and analyzes the received actual RF jamming signal.

In this case, the jamming signal measuring device 120 may include a video signal measuring device 1110 and a signal analyzer 1120. The video signal measuring device 1110 measures a waveform of the actual RF jamming signal generated by the electronic attack jamming generator 2300.

The signal analyzer 1120 analyzes a characteristic of the actual RF jamming signal generated by the electronic attack jamming generator 2300.

The measurement controller 110 controls the threat signal simulator 100 and the jamming signal measuring device 120.

Further, the measurement controller 110 controls the threat signal simulator 100 to generate the actual RF threat signal.

Furthermore, the measurement controller 110 controls the jamming signal measuring device 120 to measure and analyze the actual RF jamming signal generated by the electronic attack jamming generator 2300.

At this time, the measurement controller 110 may include a GUI-based interface for controlling the threat signal simulator 100 and the jamming signal measuring device 120.

The measurement controller 110 compares and analyzes the actual RF jamming signal generated by the electronic attack jamming generator 2300 and the actual threat signal generated by the threat signal simulator 100, and transmits a result of the comparison and the analyzation to the scenario unit 250.

Hereinafter, an electronic warfare design analysis device 20 including the SILS system and the HILS system will be described.

The electronic warfare design analysis device 20 includes the electronic warfare support receiving model unit 2000, the electronic warfare support receiving analyzer 2100, the electronic attack jamming model unit 2200, the electronic attack jamming generator 2300, the simulation situation demonstration controller 240, and the scenario unit 250.

The electronic warfare support receiving model unit 2000 includes software, as a component of the SILS system, and models an electronic warfare support (ES) receiving device of an electronic warfare system in an engineering level. The electronic warfare support receiving model unit 2000 performs functions of accumulating and allocating information capable of receiving an electronic warfare simulation threat signal from the threat signal simulator 100, converting the received signal into digital data, analyzing and identifying the digital data, and allocating various jamming techniques capable of neutralizing threats of an enemy based on the analyzed and identified digital data.

In other words, the electronic warfare support receiving model unit 2000 models functions and performance of identifying and analyzing the simulation threat signal received by the electronic warfare support receiving model unit 2000 from the scenario unit 250, thereby collecting a technique and information capable of neutralizing electronic warfare threats.

In addition, the electronic warfare support receiving analyzer 2100 is a hardware-modeled HILS system to verify the electronic warfare support receiving model unit 2000. The electronic warfare support receiving analyzer 2100 performs functions of receiving and converting the actual RF threat signal into digital data, and analyzing and identifying the converted digital data, thereby accumulating analyzed and identified information and allocating the jamming technique.

The electronic attack jamming model unit 2200 is a component of the SILS system and models an electronic warfare attack (EA) transmitting device of the electronic warfare system in an engineering level. The electronic attack jamming model unit 2200 performs functions of generating a jamming signal by reflecting a result of allocating the jamming technique of the electronic warfare support receiving analyzer 2100 and transmitting the generated jamming signal to the scenario unit 25.

In addition, the electronic attack jamming generator 2300 is a hardware-modeled HILS system to verify the electronic attack jamming model unit 2200, and performs functions of generating the jamming signal by reflecting a result of allocating the jamming technique of the electronic warfare support receiving analyzer 2100 to the actual RF threat signal and transmitting the generated jamming signal as an actual jamming signal.

The simulation situation demonstration controller 240 controls the electronic warfare support receiving model unit 2000 to model a device for allocating a jamming technique corresponding to a reset scenario to a simulation RF threat signal.

In addition, the simulation situation demonstration controller 240 controls the electronic warfare support receiving analyzer 2100 to allocate the jamming technique corresponding to the reset scenario to the actual RF threat signal by using the modeled device for allocating the jamming technique corresponding to the reset scenario.

Further, the simulation situation demonstration controller 240 controls the electronic attack jamming model unit 2200 to model a device for generating a simulation jamming signal by allocating the jamming technique corresponding to the reset scenario.

Furthermore, the simulation situation demonstration controller 240 controls the electronic attack jamming generator 2300 to generate the actual jamming signal by using the modeled device for allocating the jamming technique corresponding to the reset scenario.

In addition, the simulation situation demonstration controller 240 controls the scenario unit 250 to reset, if the actual jamming signal generated by the electronic attack jamming generator 2300 does not satisfy a predetermined standard, a scenario corresponding thereto.

The simulation situation demonstration controller 240 performs functions of showing simulation status and storing a result thereof.

In addition, the simulation situation demonstration controller 240 may receive models modeled by the electronic warfare support receiving model unit 2000 and the electronic attack jamming model unit 2200, thereby showing simulation status and storing a result thereof.

Further, the simulation situation demonstration controller 240 may receive results from the electronic warfare support receiving analyzer 2100 and the electronic attack jamming generator 2300, thereby showing and storing simulation status.

Furthermore, the simulation situation demonstration controller 240 performs a simulation central control function when the electronic warfare support receiving model unit 2000, the electronic warfare support receiving analyzer 2100, the electronic attack jamming model unit 2200, and the electronic attack jamming generator 2300 are driven.

The simulation situation demonstration controller 240 may show the simulation status and store the results thereof. For example, the simulation situation demonstration controller 240 may show status of collecting the ES, analyzing the ES, identifying the ES, the ES, a self-check result, and the like, and may store data, system log, and the like.

The scenario unit 250 generates the simulation threat signal corresponding to an input scenario and transmits the simulation threat signal to the electronic warfare support receiving model unit 2000.

In addition, the scenario unit 250 receives the simulation jamming signal generated by the electronic attack jamming model unit 2200.

At this time, the scenario unit 250 is an engagement-level electronic warfare threat environment M&S system based on a Discrete Event System Specification (DEVS). The scenario unit 250 may transmit the simulation threat signal to the electronic warfare support receiving model unit 2000 and receive the simulation jamming signal from the electronic attack jamming model unit 2200 to perform the M&S.

In addition, the scenario unit 250 may perform a function of generating an electronic warfare encounter scenario with a target electronic warfare system and a target electronic warfare threat signal, and provide an engagement scenario to the SILS system and the HILS system based on the electronic warfare encounter scenario. At this time, the HILS system may transmit the electronic warfare encounter scenario to the measurement controller 110.

In addition, the scenario unit 250 generates simulation electronic warfare threat signal based on modeling of a target threat and a target system, models electronic warfare battlefield environment including modeling of a battlefield environment (noise, signal distortion and omission, a propagation loss environment model and algorithm) based on Equation 1 below, and generates an electronic warfare scenario reflecting single threat information or multiple threat information (location, speed, movement path, etc.) to store and manage.

$$P_r = \frac{P_t G^2 \lambda^2 \sigma}{(4\pi)^3 L_s R^4} F^4 \quad \text{[Equation 1]}$$

Herein, $P_r$: received power of radar $P_t$: transmitted power of the radar

G: antenna gain of the radar

λ: wavelength (m)

σ: Radar Cross Section (RCS)

$L_s$: scanning loss

R: distance between the radar and the target $F^4$: propagation model (terrain, altitude, rainfall, fog, snow, dust)

Further, the scenario unit 250 may perform a simulation function. At this time, a function and performance of the model may be simulated by the electronic warfare scenario.

Hereinafter, a method of controlling the non-communication electronic warfare system design analysis system 1 based on engineering modeling will be described in detail with reference to FIG. 2.

Figure 2:
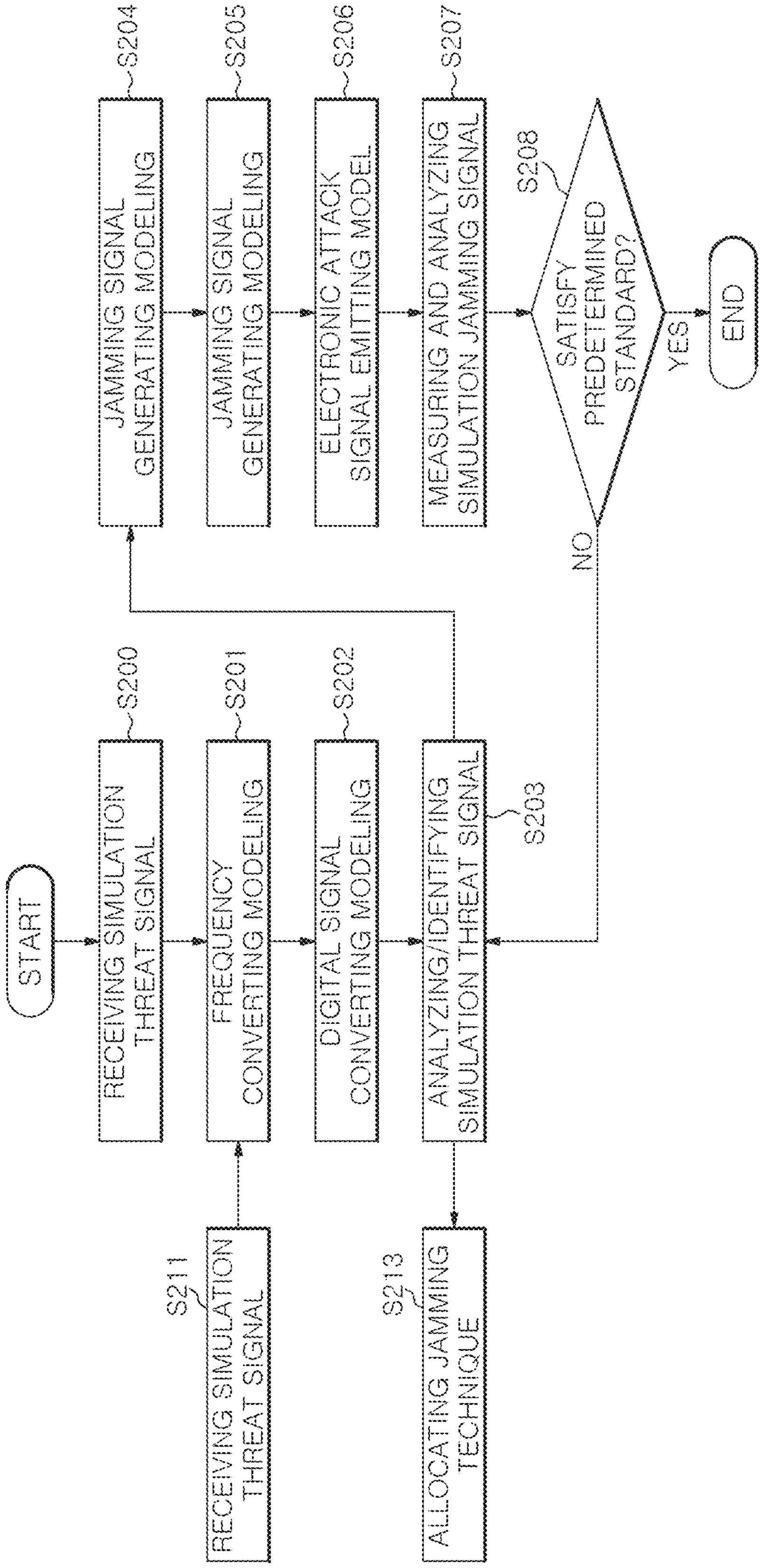
FIG. 2 shows a flowchart illustrating a method of controlling SILS in a non-communication electronic warfare system design analysis system based on engineering modeling.

FIG. 2 shows a flowchart illustrating a method of controlling SILS in the non-communication electronic warfare system design analysis system 1 based on engineering modeling.

In a step S200, a simulation threat signal is received.

Specifically, the scenario unit 250 generates a simulation RF threat signal of an electronic warfare threat. It is determined whether the electronic warfare support receiving model unit 2000 received the simulation RF threat signal generated by the scenario unit 250 based on Equation 2 below.

$$s = \frac{P_T G_T G \lambda^2}{(4\pi)^2 R^2 L_p} F_p^2 \quad \text{[Equation 2]}$$

Herein,

S: collected signal power (dBm)

$P_T$: transmitted power of radar $G_T$: transmitting antenna gain of the radar

G: receiving antenna gain

λ: wavelength (m)

R: distance $L_p$: deflection loss of propagation $F_p$: transmission factor (free space: 1) of the propagation In a step S211, actual RF threat signal information may be received and converted into an intermediate frequency (IF) signal.

Specifically, an actual RF threat signal may be generated by the threat signal simulator 100 of the development support device 10 and input into a frequency conversion modeling equipment. Herein, the threat signal simulator 100 may be an agile signal generator.

At this time, frequency of the generated actual RF threat signal is high frequency. By using this information, the frequency of the actual RF threat signal received by an electronic warfare support receiver signal injection model unit 2010 may be converted into intermediate frequency so that the IF signal may be generated.

In a step S201, a device for converting the frequency of the received simulation threat signal is modeled.

Specifically, the electronic warfare support receiver signal injection model unit 2010 models the device for receiving the simulation RF threat signal generated by the scenario unit 250 and converting the frequency thereof. Herein, the frequency of the received simulation RF threat signal is the high frequency. A device for converting the simulation RF threat signal into the IF signal by converting the frequency of the simulation RF threat signal having the high frequency into the intermediate frequency is modeled.

In a step S202, a device for converting the IF signal into a digital signal is modeled.

Specifically, a digital receiver model unit 2030 receives the IF signal. A device for converting and storing the received IF signal into In-Phase and Quadrature (I/Q) data as the digital signal is modeled based on engineering modeling.

In step S203, a device for measuring data of the simulation threat signal converted into the digital signal as described in a following example, analyzing/identifying the measured data, and allocating a jamming technique thereto is modeled.

[Example of Measuring Data by Using the I/Q Data and Phase of a Signal]

measuring a pulse amplitude (PA): $PA=\sqrt{I^2+Q^2}$, measuring a time of arrival: measuring a time at which a signal with a PA value above a reception threshold arrives, measuring a pulse width: measuring rising and falling edge of the signal after receiving the signal with the PA value above the reception threshold, measuring frequency: measuring an amount of a change in the phase or a result calculating Fast Fourier Transform (FFT) of the I/Q data, measuring performance: measuring a change in the frequency/the phase of a pulse (for example, frequency modulation on the pulse and phase modulation on the pulse)

measuring the phase:

$$\varphi = A\tan\left(\frac{Q}{I}\right)$$

Specifically, a signal analysis model unit 2040 analyzes and identifies the digital signal, generated by the digital receiver model unit 2030, into which the simulation threat signal is converted. In addition, in a step S213, a device for allocating a jamming technique corresponding to the simulation threat signal is modeled. In other words, the jamming technique for the threat is allocated to the digital signal generated by the digital receiver model unit 2030 through the analysis and identification for the electronic warfare threat signal performed by the signal analysis model unit 2040.

In a step S204, a device for generating the jamming signal is modeled by a jamming signal generating model 2210.

Specifically, the jamming signal generating model 2210 is modeled for a jamming technique generating model 2220 to generate a synchronous jamming signal or a jamming signal including noise for the electronic warfare threat signal which is analyzed and identified by the signal analysis model unit 2040.

In a step S205, a device is modeled to generate a jamming signal by using the allocated jamming technique.

Specifically, the jamming technique generating model 2220 is modeled to receive the jamming signal including noise from the jamming signal generating model 2210. In this case, the jamming technique generating model 2220 is modeled to generate the jamming signal from the jamming signal including noise by using the jamming technique allocated by the signal analysis model unit 2040. Herein, the generated jamming signal is in an intermediate frequency (IF) state.

In a step S206, a device for converting the jamming signal in the IF state into the high frequency and emitting the converted jamming signal is modeled.

Specifically, an electronic attack signal emitting model 2230 models a device that emits a simulation jamming signal that is the signal received from the jamming technique generating model 2220 and then converted into the high frequency.

In a step S207, the simulation jamming signal generated by the electronic attack signal emitting model 2230 is measured and analyzed by the scenario unit 250.

Specifically, performance of the jamming signal in an initial electronic warfare threat model of the scenario unit 250 that is input to the electronic warfare support receiver signal injection model unit 2010 for an electronic attack signal output to the scenario unit 250 from the electronic attack signal emitting model 2230 is analyzed based on Equation 3 below.

$$\frac{J}{S} = \frac{P_{JX}}{P_{RX}} = \frac{P_j G_j 4\pi R^2}{P_r G_r \sigma} \quad \text{[Equation 3]}$$

Herein, $P_j$: output power of jammer $G_j$: antenna gain of the jammer

R: distance between radar and the jammer $P_r$: output power of the radar $G_r$: antenna gain of the radar

σ: RCS

In a step S208, it is determined whether the actual jamming signal satisfies a predetermined standard.

Specifically, if the jamming signal received by the scenario unit 250 in the step S208 does not satisfy the predetermined standard, the simulation situation demonstration controller 240 controls the scenario unit 250 to reset a scenario corresponding thereto.

Further, the simulation situation demonstration controller 240 controls the electronic warfare support receiving model unit 2000 to model a device that allocates a jamming technique corresponding to the reset scenario to the simulation RF threat signal.

Furthermore, the simulation situation demonstration controller 240 controls the electronic attack jamming model unit 2200 to model a device that generates the simulation jamming signal by allocating the jamming technique corresponding to the reset scenario.

Figure 3A:
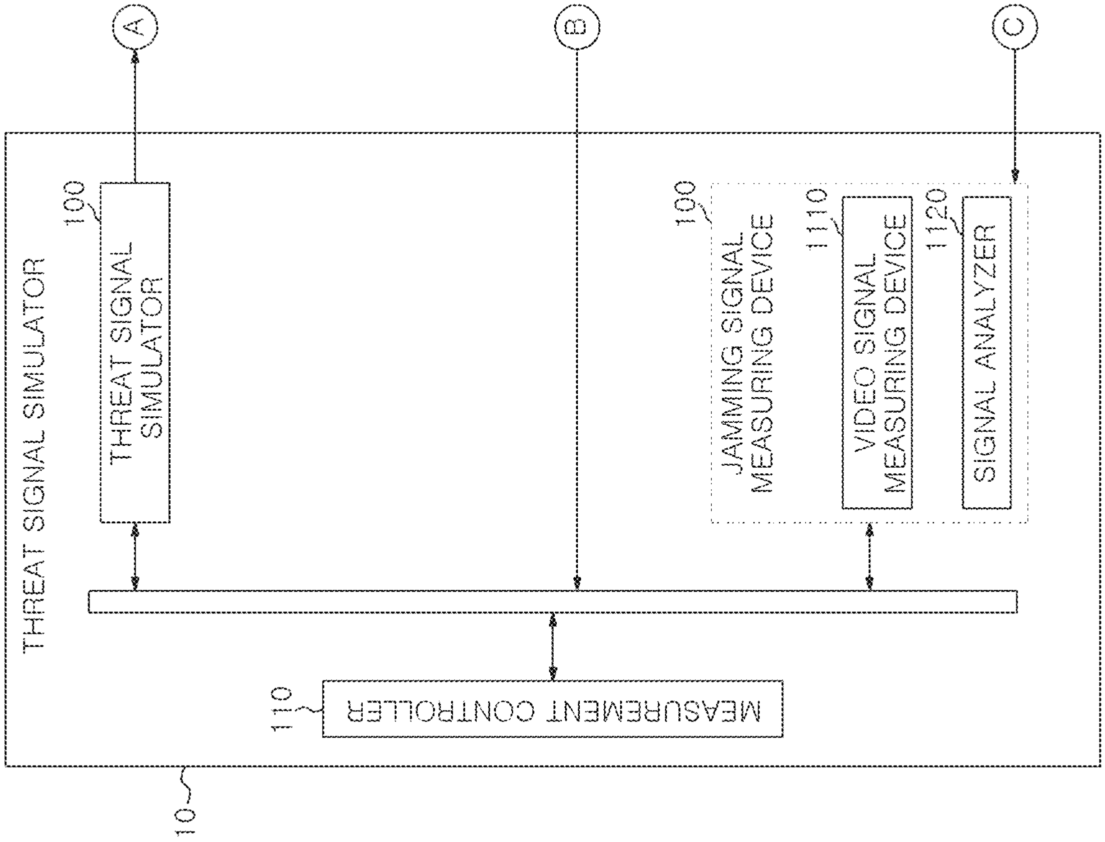
FIG. 3A and FIG. 3B show a detailed configuration of a non-communication electronic warfare system design analysis system based on engineering modeling according to one embodiment.
Figure 3B:
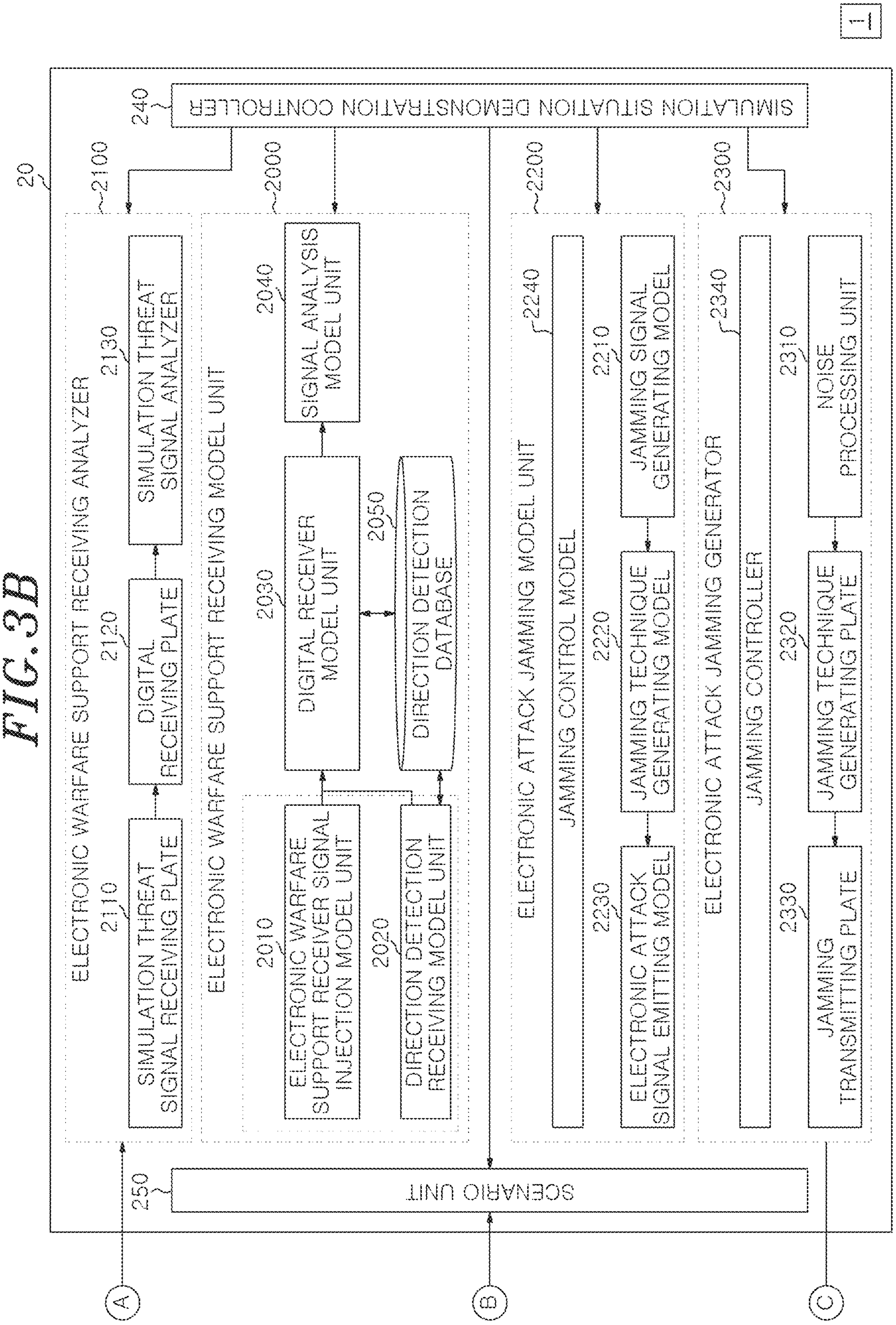

FIG. 3A and FIG. 3B shows a detailed configuration of the non-communication electronic warfare system design analysis system 1 based on engineering modeling according to one embodiment.

Hereinafter, the configuration of the non-communication electronic warfare system design analysis system 1 based on engineering modeling according to one embodiment will be described with reference to FIG. 3A and FIG. 3B.

The electronic warfare support receiving model unit 2000 classifies/identifies a simulation threat signal received from the scenario unit 250 and models a device in an engineering level to allocate a jamming technique corresponding thereto.

The electronic warfare support receiving model unit 2000 includes the electronic warfare support receiver signal injection model unit 2010, a direction detection receiving model unit 2020, the digital receiver model unit 2030, the signal analysis model unit 2040, and a direction detection database (DB) (phase and signal strength) 2050.

The electronic warfare support receiver signal injection model unit 2010 models a device that converts frequency of the received simulation threat signal into an IF.

Specifically, the electronic warfare support receiving model unit 2000 receives the simulation RF threat signal from the scenario unit 250. The frequency of the received simulation RF threat signal is high frequency. At this time, the received simulation RF threat signal is converted into an IF signal having the IF.

In this case, the electronic warfare support receiver signal injection model unit 2010 models a device for converting the frequency of the received simulation RF threat signal into the IF of the IF signal in the engineering level.

The direction detection receiving model unit 2020 interlocks with the electronic warfare support receiver signal injection model unit 2010 to receive a simulation signal within a range of a detection area.

Specifically, the electronic warfare support receiving model unit 2000 receives the simulation RF threat signal from the scenario unit 250 within the detection area. At this time, the direction detection receiving model unit 2020 interlocks with the direction detection DB 2050 in order to receive the simulation RF threat signal within the detection area. In this case, the direction detection DB 2050 may include direction detection data obtained in advance.

Herein, a direction detection range may be capable of receiving signals in a range of 0 to 360 degrees in a predetermined frequency range.

Further, the direction detection receiving model unit 2020 may derive a result of the direction detection by interworking with the direction detection DB 2050.

Furthermore, the direction detection receiving model unit 2020 may have an interface including an algorithm for the direction detection in a software component method to verify performance of direction detection signal processing modeling (for example, direction detection algorithm, direction detection error analysis for each antenna arrangement by frequency, direction detection error estimation modeling of azimuth and elevation angle).

In this case, in order to verify the electronic warfare support receiver signal injection model unit 2010 implemented in software, a modeling result may be verified by building a standard simulation threat signal receiving plate 2110 corresponding thereto.

The digital receiver model unit 2030 converts the simulation signal of which frequency is converted into the IF into a digital signal.

A digital receiving plate 2120 converts the IF signal, that is generated by the simulation threat signal receiving plate 2110 by converting the frequency thereof into the IF, into the digital signal.

At this time, the digital receiver model unit 2030 models and stores a device for receiving and converting the generated IF signal into the digital signal in the engineering level.

In addition, the digital receiver model unit 2030 models a device for deriving the result of the direction detection generated by the direction detection receiving model unit 2020 by interlocking with the direction detection DB 2050 in the engineering level.

In this case, in order to verify the digital receiver model unit 2030 implemented in software, a modeling result may be verified by building the standard digital receiving plate 2120 corresponding thereto.

The signal analysis model unit 2040 models a device for allocating the jamming technique by analyzing and identifying the threat signal by using the simulation threat signal converted into the digital signal.

Specifically, the device is modeled to analyze and identify the IF signal converted by the digital receiver model unit 2030 into the digital signal. In addition, a function of allocating the jamming technique for each analyzed and identified IF signal is modeled in the engineering level.

This is to model an electronic warfare signal receiving device in software, and the signal analysis model unit 2040 may model a signal analysis algorithm including a de-interleaving function of the threat signal, signal processing and analysis, signal identification, location estimation, and the like in an environment concentrated with a maximum of 32 multiple threat signals. In addition, a control function over the electronic warfare support receiving model unit 2000 may be included.

Further, the signal analysis model unit 2040 may have an interface for inserting the signal analysis algorithm in a software component method to verify performance of the signal analysis algorithm. In this case, in order to verify the signal analysis model unit 2040 implemented in software, a modeling result may be verified by building the standard simulation threat signal analyzer 2130 corresponding thereto.

The electronic warfare support receiving analyzer 2100 included in an HILS system includes the simulation threat signal receiving plate 2110, the digital receiving plate 2120, and the simulation threat signal analyzer 2130.

The simulation threat signal receiving plate 2110 converts a frequency of an actual threat signal received from the threat signal simulator 100 into the IF by using the device modeled by the electronic warfare support receiver signal injection model unit 2010.

Specifically, the simulation threat signal receiving plate 2110 receives the actual RF threat signal from the threat signal simulator 100. Since the frequency of the actual RF threat signal is in the high-frequency form, the actual RF threat signal is converted into the IF signal having the IF to verify the modeling of the electronic warfare support receiver signal injection model unit 2010.

In addition, the simulation threat signal receiving plate 2110 may have a function to detect a signal by controlling information of a reception threshold (for frequency range, signal strength, receiving sensitivity, collected time, collected number, etc.) in a predetermined frequency range.

The digital receiving plate 2120 converts the IF signal of which frequency is converted to the IF into the digital signal to verify the modeling of the digital receiver model unit 2030.

Specifically, the digital receiving plate 2120 digitally converts and stores the IF signal converted by the simulation threat signal receiving plate 2110. In this case, the IF signal is digitally converted to verify the modeling of the digital receiver model unit 2030.

The simulation threat signal analyzer 2130 allocates the jamming technique to the actual threat signal converted into the digital signal to verify the modeling of the signal analysis model unit 2040.

Specifically, the simulation threat signal analyzer 2130 analyzes and identifies the digitally converted IF signal, thereby allocating the jamming technique. At this time, the jamming technique is allocated to the actual threat signal to verify the modeling of the signal analysis model unit 2040.

The electronic attack jamming model unit 2200 generates, by referring to the jamming technique allocated by the simulation threat signal analysis model unit 2040 to the received simulation signal, an engineering-level model for calculating the jamming signal corresponding thereto.

Specifically, the electronic attack jamming model unit 2200 includes the jamming signal generating model 2210, the jamming technique generating model 2220, the electronic attack signal emitting model 2230, and a jamming control model 2240.

The jamming signal generating model 2210 generates a model for generating the jamming signal including noise from the jamming signal generating model 2210.

Specifically, engineering-level modeling is performed to generate a synchronization signal or the jamming signal including noise from the already installed jamming signal generating model 2210.

This is to model a jamming signal model in software, that is a model capable of simulating generation of a synchronization jamming signal and the jamming signal including noise.

In this case, in order to simulate the synchronization jamming signal, a function and performance of a digital radio frequency memory (DRFM) (for example, a function and performance of the DRFM in a frequency division/time division technique) may be modeled.

In this case, in order to verify the jamming signal generating model 2210 implemented in software, a modeling result may be verified by building a standard noise processing unit 2310 corresponding thereto.

The jamming technique generating model 2220 generates a model for generating the jamming signal by applying the jamming technique allocated to the jamming signal including noise.

Specifically, the jamming technique generating model 2220 receives the simulation jamming signal including noise from the jamming signal generating model 2210. In this case, the jamming technique generating model 2220 models a device for generating the jamming signal determined to be effective in the engineering level by referring to the jamming technique allocated by the simulation threat signal analysis model unit 2040 to the received jamming signal including noise.

In this case, in order to verify the jamming technique generating model 2220 implemented in software, a modeling result may be verified by building a standard jamming technique generating plate 2320 corresponding thereto.

The electronic attack signal emitting model 2230 generates a model for converting, for simulation, frequency of the generated jamming signal into a high frequency signal and transmitting the converted signal to the scenario unit 250.

Specifically, the electronic attack signal emitting model 2230 receives a simulation jamming signal generated by the jamming technique generating model 2220. At this time, the received simulation jamming signal is in an IF state. The simulation jamming signal in the IF state is converted, for simulation, into the high frequency to generate the simulation RF jamming signal similar to the actual signal. The model for transmitting the generated simulation RF jamming signal to the scenario unit 250 is modeled in the engineering level.

In this case, in order to verify the electronic attack signal emitting model 2230 implemented in software, a modeling result may be verified by building a standard jamming transmitting plate 2330 corresponding thereto.

The jamming control model 2240 controls the jamming signal generating model 2210, the jamming technique generating model 2220, and the electronic attack signal emitting model 2230.

Specifically, the jamming control model 2240 controls the jamming signal generating model 2210 to generate the model that generates the jamming signal including noise from the jamming signal generating model.

In addition, the jamming control model 2240 controls the jamming technique generating model 2220 to generate the model that generates the jamming signal by applying the jamming technique allocated to the jamming signal including noise.

In addition, the jamming control model 2240 controls the electronic attack signal emitting model 2230 to generate the model that converts the frequency of the generated jamming signal into the high frequency and transmits the converted signal to the scenario unit 250.

In other words, the jamming control model 2240 may have a jamming control modeling function capable of controlling generation of the jamming signal, generation of the jamming technique, and transmission of the jamming signal.

At this time, in order to verify the jamming control model 2240 implemented in software, a modeling result may be verified by building a standard jamming controller 2340 corresponding thereto.

The electronic attack jamming generator 2300 includes the noise processing unit 2310, the jamming technique generating plate 2320, the jamming transmitting plate 2330, and the jamming controller 2340.

The noise processing plate 2310 generates the jamming signal including noise from the jamming signal generating model by using modeling of the jamming signal generating model 2210.

Specifically, the noise processing plate 2310 generates the synchronization signal or the jamming signal including noise from the predetermined jamming signal generating model by using the modeling of the jamming signal generating model 2210. In this case, the noise processing plate 2310 may be a DRFM processing unit.

The jamming technique generating plate 2320 generates an actual jamming signal according to the jamming technique allocated by using the modeling of the jamming technique generating model 2220.

Specifically, the actual jamming signal is generated from the jamming signal including noise generated by the noise processing plate 2310 by using the jamming technique allocated by the simulation threat signal analyzer 2130. At this time, the generated actual jamming signal is a signal in the IF state.

The jamming transmitting plate 2330 converts a frequency of the actual jamming signal generated by using the modeling of the electronic attack signal emitting model 2230 into the high frequency and transmits the converted actual jamming signal to the jamming signal measuring device 120.

Specifically, the frequency of the actual jamming signal in the IF state generated by the jamming technique generating plate 2320 is converted into the high frequency and the converted actual jamming RF signal is emitted to the jamming signal measuring device 120.

The jamming signal measuring device 120 receives the actual jamming RF signal generated by the jamming technique generating plate 2320.

The jamming signal measuring device 120 may include the video signal measuring device 1110 and the signal analyzer 1120.

The video signal measuring device 1110 measures a waveform of the actual RF jamming signal generated by the electronic attack jamming generator 2300.

The signal analyzer 1120 analyzes performance of a jamming signal. In this case, the signal analyzer 1120 analyzes performance of the actual RF jamming signal generated by the electronic attack jamming generator 2300.

Data of the actual RF jamming signal measured and analyzed by the jamming signal measuring device 120 is transmitted to the measurement controller 110.

Data of the actual RF jamming signal transmitted to the measurement controller 110 is transmitted to the scenario unit 250.

The simulation situation demonstration controller 240 compares data of the actual RF jamming signal transmitted to the scenario unit 250 with a predetermined standard.

When the data of the actual RF jamming signal does not satisfy the predetermined standard, the simulation situation demonstration controller 240 controls the scenario unit 250 to reset a scenario corresponding thereto.

In addition, the simulation situation demonstration controller 240 controls the electronic warfare support receiving model unit 2000 to model a device that allocates the jamming technique corresponding to the reset scenario to the simulation RF threat signal.

Further, the simulation situation demonstration controller 240 controls the electronic warfare support receiving analyzer 2100 to allocate the jamming technique corresponding to the reset scenario to the actual RF threat signal by using the modeled device that allocates the jamming technique corresponding to the reset scenario.

Furthermore, the simulation situation demonstration controller 240 controls the electronic attack jamming model unit 2200 to model a device that generates the simulation jamming signal by allocating the jamming technique corresponding to the reset scenario.

In addition, the simulation situation demonstration controller 240 controls the electronic attack jamming generator 2300 to generate the actual jamming signal by using the modeled device that allocates the jamming technique corresponding to the reset scenario.

The simulation situation demonstration controller 240 performs functions of showing simulation status and storing a result thereof.

The simulation situation demonstration controller 240 may show simulation status in which the electronic warfare support receiving model unit 2000 models the device for allocating the jamming technique to the simulation threat signal and store the result thereof.

The simulation situation demonstration controller 240 may show simulation status in which the electronic warfare support reception analyzer 2100 allocates the jamming technique to the actual threat signal by using the modeling of the electronic warfare support receiving model unit 2000 and store a result thereof.

The simulation situation demonstration controller 240 may show simulation status in which the electronic attack jamming model unit 2200 models the device for generating the simulation jamming signal by allocating the jamming technique to the simulation threat signal and store a result thereof.

The simulation situation demonstration controller 240 shows simulation status in which the electronic attack jamming generator 2300 generates the actual jamming signal by allocating the jamming technique to the actual threat signal by using the modeling of the electronic attack jamming model unit 2200 and store a result thereof.

Heretofore, although the embodiments have been described above with reference to the accompanying drawings, those skilled in the art to which the embodiment belongs can understand that the embodiments may be implemented in other specific forms without changing the technical idea or essential features. Therefore, it should be understood that the embodiments described above are illustrative in all respects and not limiting.

What is claimed is:

1. A non-communication electronic warfare system design analysis system based on engineering modeling, the system comprising:

a scenario unit configured to transmit a simulation threat signal corresponding to an input scenario;

a threat signal simulator configured to transmit an actual threat signal;

an electronic warfare support receiving model unit configured to receive the simulation threat signal and model a device for allocating a jamming technique;

an electronic warfare support receiving analyzer configured to allocate the jamming technique to the received actual threat signal by using the modeled device;

an electronic attack jamming model unit configured to model a device for generating a simulation jamming signal corresponding to the simulation threat signal by using the modeled device for allocating the jamming technique;

an electronic attack jamming generator configured to generate an actual jamming signal corresponding to the actual threat signal by using the modeled device for generating the simulation jamming signal; and a simulation situation demonstration controller configured to analyze performance by using the actual jamming signal and the actual threat signal, the simulation situation demonstration controller further configured to:

control the scenario unit to reset the scenario in response to the actual jamming signal not satisfying a predetermined standard, and control the electronic warfare support receiving model unit to model a device for allocating a jamming technique corresponding to the reset scenario to the actual threat signal.

2. The system of claim 1, wherein the electronic warfare support receiving model unit includes:

an electronic warfare support receiver signal injection model unit configured to receive the simulation threat signal and model a device for converting a frequency of the simulation threat signal into an intermediate frequency;

a direction detection receiving model unit configured to interlock with a direction detection database to receive the simulation threat signal within a range of a detection area;

a digital receiver model unit configured to model a device for converting the simulation threat signal of which frequency is converted into the intermediate frequency into a digital signal; and a signal analysis model unit configured to model the device for allocating the jamming technique by using the converted digital signal.

3. The system of claim 2, wherein the electronic warfare support receiving analyzer includes:

a simulation threat signal receiving plate configured to convert a frequency of the received actual threat signal into the intermediate frequency by using the device modeled by the electronic warfare support receiver signal injection model unit;

a digital receiving plate configured to convert the actual threat signal of which the frequency is converted into the intermediate frequency into the digital signal by using the device modeled by digital receiver model unit; and a simulation threat signal analyzer configured to allocate the jamming technique to the converted digital signal by using the device modeled by a signal analysis model unit.

4. The system of claim 3, wherein the electronic attack jamming model unit includes:

a jamming signal generating model unit configured to model a device for generating a jamming signal including noise from a jamming signal generating model;

a jamming technique generating model configured to model a device for generating the jamming signal by using the allocated jamming technique to the jamming signal including noise; and an electronic attack signal emitting model configured to model a device for converting a frequency of the generated jamming signal into a high frequency and emitting the converted jamming signal to the scenario unit.

5. The system of claim 4, wherein the electronic attack jamming generator includes:

a noise processing unit configured to generate the jamming signal including noise from the jamming signal generating model;

a jamming technique generating plate configured to generate the actual jamming signal according to the allocated jamming technique by using the device modeled by the jamming technique generating model; and a jamming transmitting plate configured to convert the frequency of the generated actual jamming signal into the high frequency and emit the converted actual jamming signal to a jamming signal measuring device by using the device modeled by electronic attack signal emitting model.

6. The system of claim 5, further comprising:

the jamming signal measuring device configured to measure the actual jamming signal of which frequency is converted into the high frequency; and a measurement controller configured to configured to control the threat signal simulator and the jamming signal measuring device.

7. A method of controlling a non-communication electronic warfare system design analysis system based on engineering modeling, the method comprising:

transmitting a simulation threat signal corresponding to an input scenario;

transmitting an actual threat signal;

receiving the simulation threat signal and modeling a device for allocating a jamming technique;

allocating the jamming technique to the received actual threat signal by using the modeled device;

modeling a device for generating a simulation jamming signal corresponding to the simulation threat signal by using the modeled device for allocating the jamming technique;

generating an actual jamming signal corresponding to the actual threat signal by using the modeled device for generating the simulation jamming signal; and analyzing performance by using the actual jamming signal and the actual threat signal, wherein analyzing the performance includes:

controlling the scenario to be reset in response to the actual jamming signal not satisfying a predetermined standard; and controlling a device for allocating a jamming technique corresponding to the reset scenario to the actual threat signal to be modeled.

8. The method of claim 7, wherein modeling the device for allocating the jamming technique includes:

receiving the simulation threat signal and modeling a device for converting a frequency of the simulation threat signal into an intermediate frequency;

interlocking with a direction detection DB to receive the simulation threat signal within a range of a detection area;

modeling a device for converting the simulation threat signal of which frequency is converted into the intermediate frequency into a digital signal; and modeling the device for allocating the jamming technique by using the converted digital signal.

9. The method of claim 8, wherein allocating the jamming technique to the received actual threat signal includes:

converting a frequency of the received actual threat signal into the intermediate frequency by using the modeled device for converting the frequency into the intermediate frequency;

converting the actual threat signal of which the frequency is converted into the intermediate frequency into the digital signal by using the modeled device for converting the simulation threat signal into the digital signal; and allocating the jamming technique to the converted digital signal by using the modeled device for allocating the jamming technique.

10. The method of claim 9, wherein modeling the device for generating the simulation jamming signal corresponding to the simulation threat signal includes:

modeling a device for generating a jamming signal including noise from a jamming signal generating model;

modeling a device for generating the jamming signal by using the allocated jamming technique to the jamming signal including noise; and modeling a device for converting a frequency of the generated jamming signal into a high frequency and emitting the converted jamming signal.

11. The method of claim 10, wherein generating the actual jamming signal corresponding to the actual threat signal includes:

generating the jamming signal including noise from the jamming signal generating model by using the modeled device for generating the jamming signal including noise; and generating the actual jamming signal according to the allocated jamming technique by using the modeled device for generating the jamming signal.

12. The method of claim 11, further comprising:

converting the frequency of the generated actual jamming signal into the high frequency and emitting the converted actual jamming signal by using the modeled device for converting the frequency into the high frequency and emitting the converted jamming signal; and measuring the jamming signal of which frequency is converted into the high frequency.

* * * * *